United States Patent [19]
Troxell et al.

[11] Patent Number: 5,933,277
[45] Date of Patent: Aug. 3, 1999

[54] IMAGING SYSTEM COMBINING VISIBLE AND NON-VISIBLE ELECTROMAGNETIC RADIATION FOR ENHANCED VISION

[75] Inventors: John Richard Troxell, Sterling Heights; Marie Irene Harrington, Troy, both of Mich.

[73] Assignee: General Motors Corporation, Detroit, Mich.

[21] Appl. No.: 09/086,908

[22] Filed: May 29, 1998

[51] Int. Cl.$^6$ .............................. G02B 5/18; G02B 23/12
[52] U.S. Cl. ...................... 359/573; 359/569; 359/350; 359/224; 359/353
[58] Field of Search ................................... 359/572, 573, 359/569, 350, 855, 224, 291, 295, 615, 353

[56] References Cited

U.S. PATENT DOCUMENTS

| | | | |
|---|---|---|---|
| 5,311,360 | 5/1994 | Bloom et al. | 359/572 |
| 5,661,592 | 8/1997 | Bornstein et al. | 359/291 |
| 5,757,536 | 5/1998 | Ricco et al. | 359/224 |

OTHER PUBLICATIONS

Solid State Sensors and Actuators Workshop (Jun. 13–16, 1994), "Grating Light Valves for High Resolution Displays" by Raj B. Apte, Francisco S. A. Sandejas, William C. Banyai and David M. Bloom, Glinzton Laboratory, Stanford University.

Proceedings of the SPEI Conference 2463 on Synthetic Vision for Vehicle Guidance and Control, Apr. 1995, "Color Night Vision: Fusion of Intensified Visible and Thermal IR Imagery", by Allen M. Waxman, David A. Fay, Alan Gove, Michael Seibert, Joseph P. Racamato, James E. Carrick, and Eugene D. Savoye, MIT Lincoln Laboratory.

Elsevier, Sensors and Actuators A 57 (1996) 145–151, "Polysilicon Micromechanical Gratings for Optical Modulation", by D. E. Sene, V. M. Bright, J. H. Comtois, J. W. Grantham.

SPIE vol. 3046–0277–786X/97, (Smart Structures and Materials 1997—Smart Electronics and MEMS) "Gray Scale Deformable Grating Spatial Light Modulator for High Speed Optical Processing", by Miles L. "Scotty" Scott, Lawrence A. Bieber, Dr. T. S. Kalkur, University of Colorado.

*Primary Examiner*—Jon Henry
*Attorney, Agent, or Firm*—Robert M. Sigler; George A. Grove

[57] ABSTRACT

An imaging system provides a visible image of a scene enhanced by information from electromagnetic radiation from the scene at a non-visible wavelength without parallax-induced errors. First optical apparatus collects electromagnetic radiation from a scene and directs it onto an array of bi-state diffraction grating elements to form a combined image of the scene on the array at both visible and non-visible wavelengths. The bi-state diffraction grating elements of the array are sequentially and temporarily activated in a predetermined order to an activated state providing diffraction of incident electromagnetic radiation of the visible and non-visible wavelengths in a predetermined manner from an inactivated state in which such diffraction is not provided. The electromagnetic radiation so diffracted is collected and directed toward detector apparatus which provides coded electrical representation of scanned images of the scene in electromagnetic radiation of the visible and non-visible wavelengths. The imaging system generates an enhanced human-detectable signal from the coded representations of the separate scanned images of the scene in electromagnetic radiation of the visible and non-visible wavelengths. The grating elements of the diffraction grating array may diffract radiation of the non-visible and visible wavelengths at first and second predetermined angles, respectively, to different detectors. Alternatively, the diffraction grating array may have an alternating mix of diffraction grating elements having first and second grating pitches to diffract electromagnetic radiation of the visible and non-visible wavelengths at the same predetermined angle to a single detector.

3 Claims, 5 Drawing Sheets

5,933,277

IMAGING SYSTEM COMBINING VISIBLE AND NON-VISIBLE ELECTROMAGNETIC RADIATION FOR ENHANCED VISION

TECHNICAL FIELD

The technical field of this invention is an imaging system for enhanced vision which combines visible light with non-visible electromagnetic radiation such as infrared or ultraviolet radiation.

BACKGROUND OF THE INVENTION

There have been many attempts to provide enhanced vision for situations or environments in which visible light is restricted, such as at night or in fog or haze. One approach is to convert an image formed by electromagnetic radiation at a non-visible frequency such as infrared into a visible representation of the image and combine the representation with a normally visible image of the same scene by superposition to enhance the latter. Such techniques are used for night vision, where visible light is very low, and show promise for enhanced vision in fog or haze, which absorb or scatter visible light. Infrared radiation is particularly promising for such enhanced vision, since it is emitted as well as reflected by bodies and since there are several wavelength bands within the infrared (IR) spectrum which are subject to significantly less absorption by atmospheric moisture such as haze and fog.

Unfortunately, the practical application of such techniques has been limited by the problem of parallax. The enhanced image has been provided by separately collecting and processing electromagnetic radiation from a scene in visible and non-visible wavelength bands and combining the visible and non-visible image information into a single enhanced visible image. However, the separate sensors for visible and invisible electromagnetic radiation have not provided the same view of the scene; and it has thus been difficult to combine the outputs of the sensors into an accurate, enhanced visible image.

SUMMARY OF THE INVENTION

The imaging system of this invention solves the problem of parallax by collecting electromagnetic radiation from a scene and directing it onto an array of bi-state diffraction grating elements to form a combined image of the scene on the array at both visible and non-visible wavelengths. Each bi-state diffraction grating element of the array has an activated state providing diffraction of incident electromagnetic radiation of the visible and non-visible wavelengths in a predetermined manner and an inactivated state in which such diffraction of incident electromagnetic radiation of the visible and non-visible wavelengths is not provided.

The imaging system has apparatus for scanning, the combined image on the array by sequentially activating the bi-state diffraction grating elements in a predetermined order temporarily from their deactivated states to their activated states, whereby separate scanned images of the scene in electromagnetic radiation of the visible and non-visible wavelengths are diffracted from the array in the predetermined manner. The electromagnetic radiation so diffracted is collected and directed toward detector apparatus which provides a coded electrical representation of the scanned images of the scene in electromagnetic radiation of the visible and non-visible wavelengths. The imaging system has further apparatus for generating an enhanced human-detectable signal from the coded representations of the separate scanned images of the scene in electromagnetic radiation of the visible and non-visible wavelengths. By separating the scanning function from the detecting function and scanning images at both visible and non-visible wavelengths from the same array, the apparatus eliminates the parallax problem.

In one embodiment, electromagnetic radiation of the visible and non-visible wavelengths is preferably diffracted from the grating elements at first and second predetermined angles, respectively; and the electromagnetic radiation diffracted at the first and second predetermined angles is thus collected and directed, respectively, to first and second detectors.

In another embodiment, the diffraction grating array comprises an alternating mix of diffraction grating elements having first and second grating pitches effective, in the activated state, to diffract electromagnetic radiation of the visible and non-visible wavelengths at the same predetermined angle; and the electromagnetic radiation so diffracted is collected and directed either to first and second detectors or to a single detector.

DESCRIPTION OF THE PREFERRED EMBODIMENT

Figure 1:
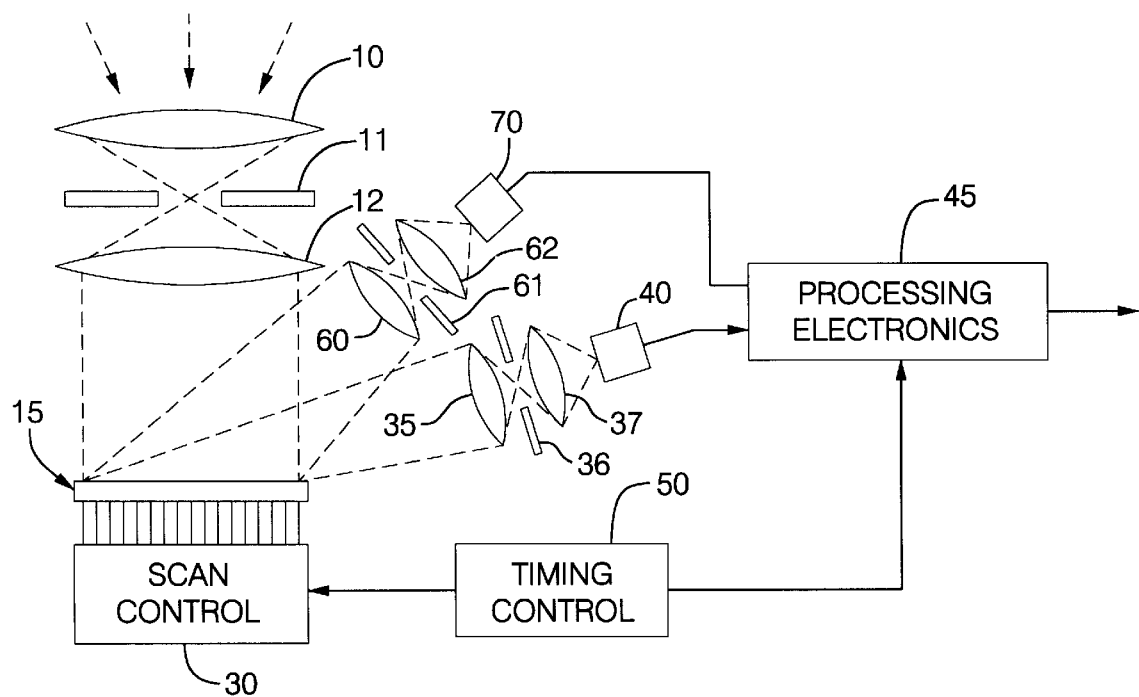
FIG. 1 shows a schematic diagram of a preferred embodiment of an imaging system according to the invention.

Referring to FIG. 1, electromagnetic radiation, which may include visible as well as non-visible wavelengths, is reflected and/or emitted from a scene; and this radiation is collected and directed by conventional optical apparatus, represented by lenses 10 and 12 and an aperture or diaphragm 11. A typical embodiment collects and directs, for example, one or more wavelengths in the visible light band of the spectrum and one or more wavelengths in other, non-visible portions of the electromagnetic spectrum: in this embodiment, the near (2.3 microns) or middle (4 microns) infra-red band. Lens 10 represents optical apparatus for collecting electromagnetic radiation from the scene. Although a single lens may be sufficient, other equivalent arrangements of lenses or equivalent apparatus are known in the art. Aperture 11 represents optical apparatus for eliminating electromagnetic radiation which is not from the scene; and lens 12 represents optical apparatus for directing and focusing the electromagnetic radiation passed by the previous two elements. The apparatus may also comprise optical filter apparatus, not shown, for eliminating radiation in wavelength bands which are not of interest in a specific imaging system. This optical apparatus directs the collected electromagnetic radiation to a diffraction grating array (DGA) 15 in such manner as to provide a combined image of the scene on the array in electromagnetic radiation of the visible and non-visible wavelengths. The apparatus for collection and direction of electromagnetic radiation is not to be limited to refractive apparatus as shown: reflective optical apparatus may be used, either alternatively or in combination as known to those, skilled in the art of optical design. Reflective optics may provide particular advantages in embodiments requiring the collection and direction of electromagnetic radiation at two or more greatly different wavelengths.

Figure 2:
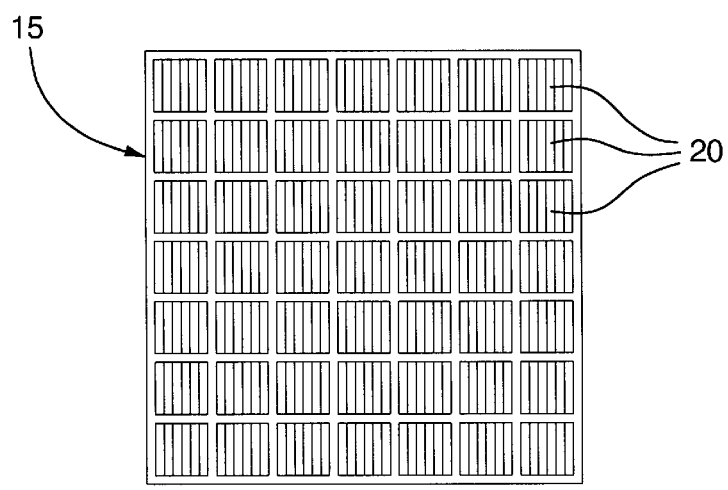
FIG. 2 shows a top view of a portion of a diffraction grating array for use in the system of FIG. 1.

DGA 15 comprises a plurality of diffraction grating (DG) elements 20 arranged in a two-dimensional array, a portion of which is shown in FIG. 2. Each of DG elements 20 comprises a bi-state diffraction grating for electromagnetic radiation. Each DG element 20 is responsive to an electric control signal to switch to an activated state, in which it diffracts electromagnetic radiation of predetermined wavelengths at predetermined angles relative to the incident direction, from an inactivated state in which it does not so diffract electromagnetic radiation of the predetermined wavelengths at the predetermined angles. In this embodiment, all DG elements 20 are identical and, in the activated state, will diffract electromagnetic radiation of a visible wavelength at a first predetermined angle and electromagnetic radiation of a non-visible wavelength at a second predetermined angle. In the inactivated state, DG elements 20 will not diffract or otherwise direct any significant electromagnetic radiation at either of the first and second predetermined angles.

Figure 3A:
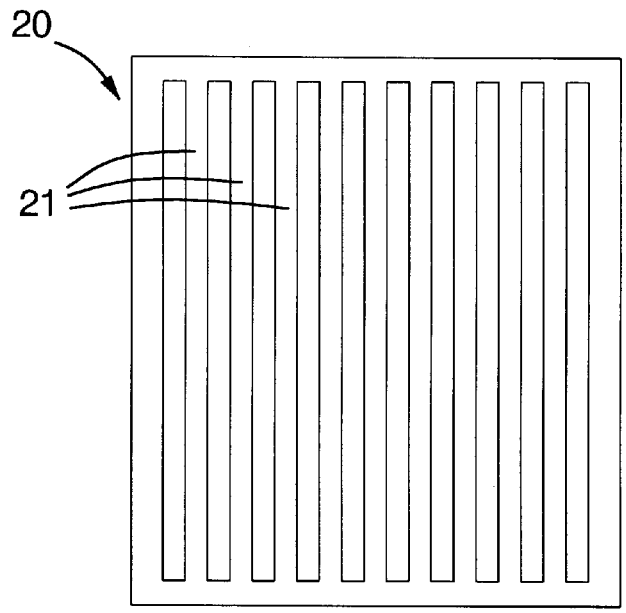
FIGS. 3A–3C show top and side views of the diffraction grating element for use in the array of FIG. 2 in an inactivated state.
Figure 3B:
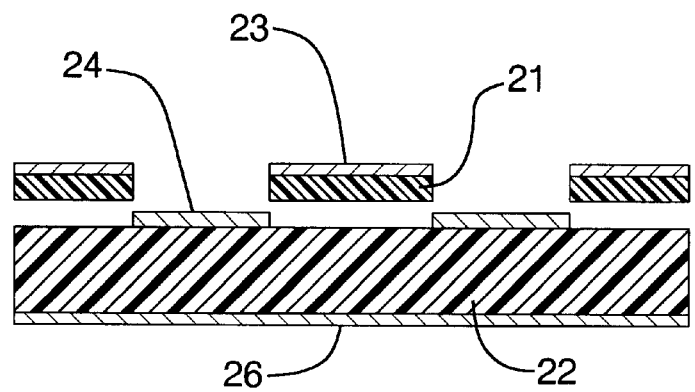
Figure 3C:
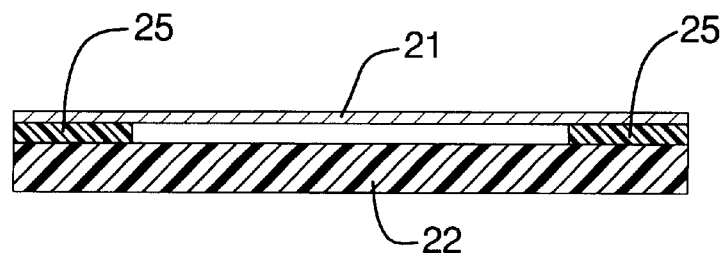

A representative DG element 20 is shown in its inactivated state in FIGS. 3A–3C. FIG. 3A shows the element in top view, with a plurality of parallel bars 21 of constant width, the width of each bar being on the order of one half the pitch between adjacent bars. FIG. 3B shows a side cutaway view perpendicular to bars 21. Each bar 21 is suspended over and parallel to a substrate 22. Bars 21 are each provided with an optically reflective and electrically conducting coating 23 on the upper surface thereof, with a similar coating 24 on the upper surface of substrate 22 between each two adjacent bars 21. FIG. 3C is a side cutaway view of DG element 20 parallel to bars 21 which shows how a bar 21 is suspended at each end by a support 25 over substrate 22. In the inactivated state shown, the vertical distance between coating 23 on the upper surface of bars 21 and coating 24 on substrate 22 is one half the wavelength of incident electromagnetic radiation; and the incident radiation will be reflected at an angle equal to the angle of incidence.

Figure 4A:
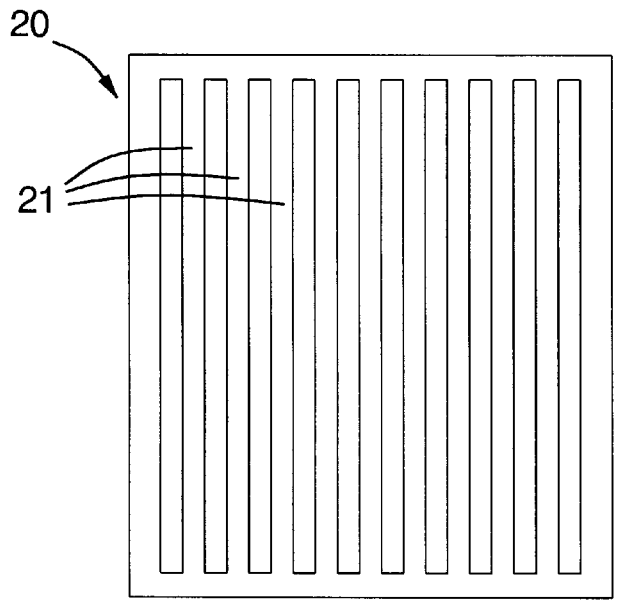
FIGS. 4A–4C show top and side views of the diffraction grating element of FIGS. 3A–3C in an activated state.
Figure 4B:
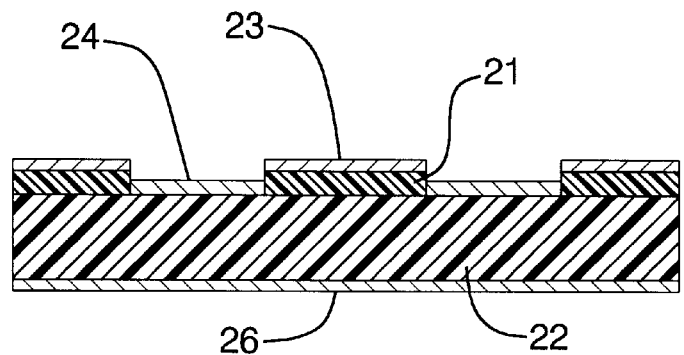
Figure 4C:
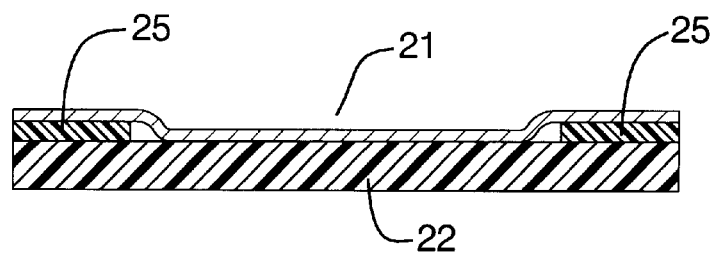

An electrical conductor 26 under substrate 22 may be provided with a voltage relative to the voltage on coatings 23, which voltage attracts bars 21 downward. When this voltage reaches a first predetermined voltage, DG element 20 is activated to its activated state, as bars 21 collapse deformably to the position shown in FIGS. 4A–4C. FIG. 4A shows the element in top view, from which perspective it looks similar to the inactivated state. However, FIG. 4B, with the element seen perpendicular to bars 21, shows that the bars have moved downward against substrate 22. This is confirmed in FIG. 4C, which shows bars 21 deformed downward. The vertical distance between coatings 23 and coating 24 is now one quarter wavelength of the incident electromagnetic radiation; and the grating thus diffracts the incident electromagnetic radiation at an angle determined by the wavelength ($\lambda$) of the incident electromagnetic radiation and the grating pitch (d), that is the spacing between bars 21. For incident light perpendicular to the grating, the angle $\theta$ of diffraction is given by:

$$d \sin \theta = n\lambda.$$

For incident light at an angle $\theta 1$ from perpendicular to the grating, the angle $\theta 2$ of diffraction is given by:

$$d(\sin \theta 1 - \sin \theta 2) = n\lambda.$$

In either case, n can take positive or negative integer values, but the intensity of the diffracted light decreases significantly for $|n|>1$. The preferred choice is therefore for $n=+/-1$. With an appropriate choice of the incident angle, e.g. perpendicular to the grating, the predetermined angle of diffraction produced by the grating in its activated state can be made different from the angles of reflection or diffraction produced by the grating in its inactivated state. In this embodiment, reduction of the applied voltage below a second predetermined voltage, lower than the first predetermined voltage due to hysteresis, allows bars 22 to return to their elevated positions. The type of DG element described above is described in further detail in U.S. Pat. No. 5,311,360, Method and Apparatus for Modulating a Light Beam, issued May 10, 1994 to Bloom et al and the paper "Grating Light Valves for High Resolution Displays," presented by Raj B. Apte et al at the Solid State Sensors and Actuators Workshop, Hilton Head Island, S.C., Jun. 13–16, 1994.

Thus, each DG element 20 has an activated state in which incident electromagnetic radiation of visible and non-visible wavelengths are diffracted in a predetermined manner—that is, at first and second predetermined angles, respectively, from the incident direction—and an inactivated state in which such diffraction is not produced. In this document, the terms "activated" and "inactivated" refer to the diffraction of radiation in the predetermined manner and not to the mechanism of operating the grating. Although the embodiment described uses diffraction grating elements having an "activated" state in which a voltage is applied and an inactivated state to which it tends to return when this voltage is not applied, another embodiment might be designed with diffraction grating elements operated in the opposite manner: i.e. having an "activated state" providing diffraction in a predetermined manner to which the element returns when a voltage is not applied and an "inactivated" state to which the grating element switches in response to an applied voltage. Alternatively, the diffraction grating elements might be bi-stable, with different voltages applied to produce each state. In any case, the "activated" state is that which provides diffraction in the predetermined manner (or whose diffraction pattern is chosen to be the predetermined manner); and the "inactivated" state is that which does not provide such diffraction, regardless of what mechanism is applied to achieve either state.

A scan/chop control 30 is capable of applying a voltage to each of the DG elements 20 of array 15 independently so as to switch each of them between its inactivated and activated states. Scan/chop control 30 normally maintains each of DG elements 20 in its inactivated state, with bars 21 elevated, but scans all the DG elements of array 15 sequentially in a predetermined pattern by switching each element, in turn, temporarily to its activated state and then back to its inactivated state before proceeding to the next element. Thus, a time-separated stream of electromagnetic radiation samples, from all areas of the scene, in a predetermined order, is diffracted at the first predetermined angle for the visible wavelength and at the second predetermined angle for the non-visible wavelength. If each DG element is activated to the second state just as the previously activated DG element is deactivated to the first state, the IR radiation diffracted from the DG elements 20 at the predetermined angle represents scanned visible and non-visible images of the scene. But if the activation of each DG element is delayed for a time period after the deactivation of the previously activated DG element, the scanned images of the scene are also chopped.

The electromagnetic radiation diffracted at the first predetermined angle is collected by conventional optical collection apparatus represented by lenses 35 and 37 and aperture or diaphragm 36, which represent apparatus similar to, or at least performing functions similar to, that represented by elements 10, 12 and 11 described previously, and which are disposed at the first predetermined angle relative to the incident direction. This optical apparatus directs and focuses electromagnetic radiation diffracted at the first predetermined angle on a detector 40, which converts this electromagnetic radiation to an output electric signal providing a coded electrical representation of the scanned, and possibly chopped, image of the scene at the non-visible wavelength. If the non-visible wavelength is in the infra-red band, detector 40 may be any such detector which is responsive to infra-red radiation to generate an electrical signal thereof. If detector 40 is of the type which does not require thermal recovery, the image need only be scanned, and the radiation of the non-visible wavelength from the successively scanned DG elements 20 will arrive at detector 40 in a substantially continuous manner. Chopping, however, will cause the electromagnetic radiation from successively scanned DG elements 20 to be separated by predetermined time periods, which will provide thermal recovery required by some types of infra-red detector.

The electromagnetic radiation diffracted at the second predetermined angle is collected by conventional optical collection apparatus represented by lenses 60 and 62 and aperture or diaphragm 61, which represent apparatus similar to, or at least performing functions similar to, that represented by elements 10, 12 and 11 described previously, and which are disposed at the second predetermined angle relative to the incident direction. This optical apparatus directs and focuses electromagnetic radiation diffracted at the second predetermined angle on a detector 70, which converts this electromagnetic radiation to an output electric signal providing a coded electrical representation of the scanned, and possibly chopped, image of the scene at the visible wavelength. Detector 70 may be any such detector, such as a silicon photo diode, which is responsive to visible electromagnetic radiation to generate an electrical signal thereof.

The electric signal output from detectors 40 and 70 is provided to processing electronics 45, which derives data from the two scanned signals and combines the data into an enhanced visible image or other human detectable signal. Timing control 50 maintains synchronism between scan/chop control 30 and processing electronics 45, so that the processing electronics "knows" when the light diffracted from each individual pixel begins and ends and what part of the scene it represents. Thus, coded signals at each picture element (pixel) from the "visible" and "non-visible" scanned images may be identified and associated with each other. Preferably, a single digital computer or digital signal processor may combine the functions of timing control 50, scan/chop control 30 and processing electronics 45. In such apparatus, the timing control activates each successive DG element in a predetermined order for a predetermined time, with a predetermined delay between activations if chopping is desired.

Processing electronics 45 comprises A/D conversion apparatus which is provided with the output voltages of the detectors and outputs digital representations of these voltages, and thus of the intensity of the pixel at the visible and non-visible wavelengths, at the end of the predetermined time. These digital numbers may then be stored in memory locations corresponding to the specified pixel or combined with pixel location bits in a longer digital number, the pixel location being communicated by the timing control. Preferred methods of handling the resulting data matrix are well known in the field of digital image processing. The enhanced visible image created may comprise a straightforward superposition of the "visible" and "non-visible" signals at each pixel of the scene, which may be used to generate a representative enhanced visible image on a known two-dimensional display device. In this example, the displayed image is directly enhanced, as an image, with the non-visible signal for viewer interpretation. But an actual image is not the only possible human-detectable signal. An algorithm may be embodied in processing electronics 45 to analyze the non-visible data stream from detector 40 in a predetermined manner and provide a symbolic signal or message to the operator of the imaging system. An example would be an algorithm which searches for an object, recognized as a connected area of pixels providing a consistently higher or lower intensity non-visible output than the surrounding pixels and matching predetermined criteria as to size, shape, location and/or movement within the scene. Upon recognition of such an object, any known symbolic signal may be generated, such as a visible or audible alarm, a readable output on a text display or a superposition of a meaningful symbol on a display of the scene derived from visible light. Naturally, the image and symbolic displays could also be combined in many ways known in the art.

Figure 5:
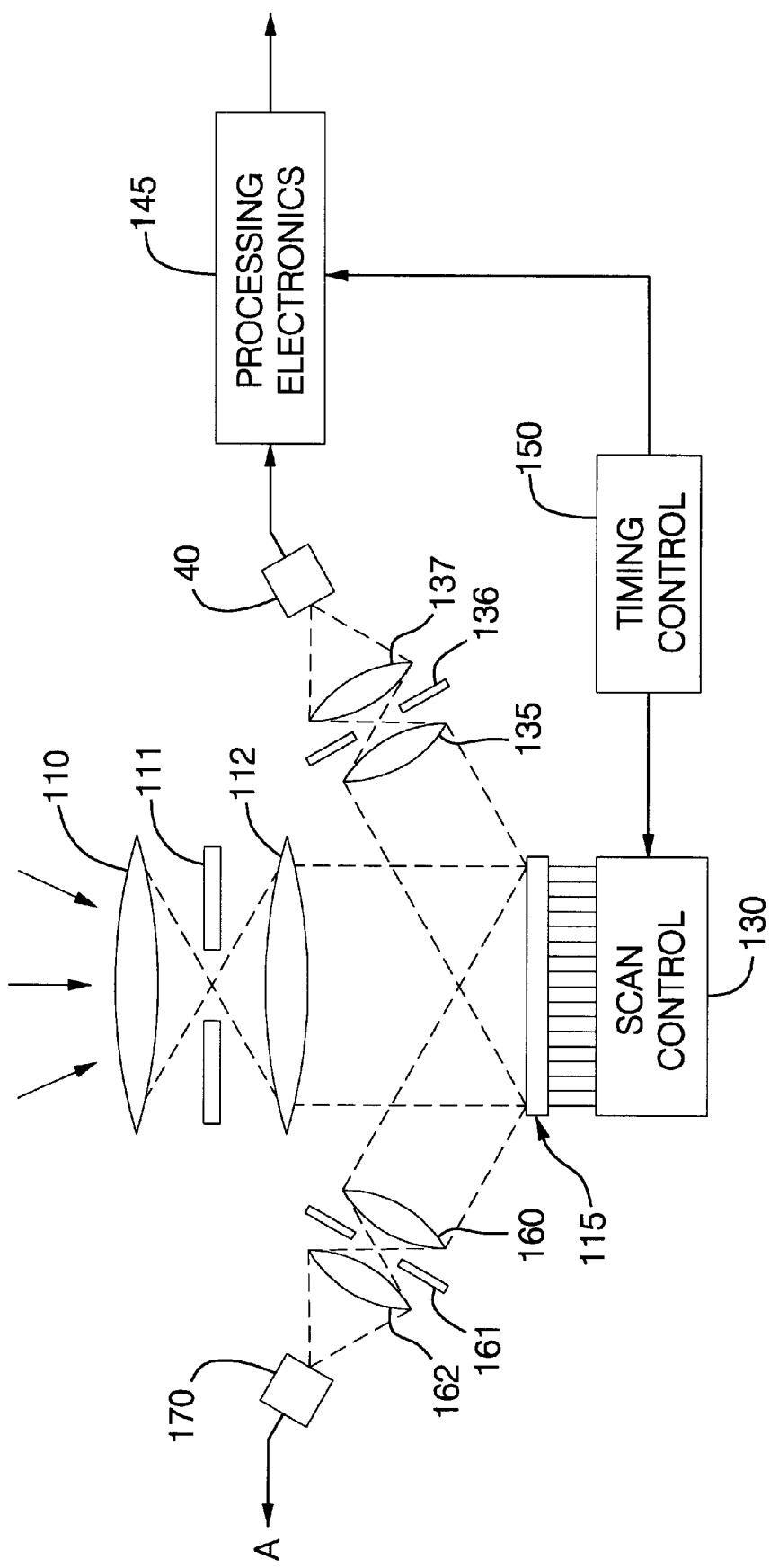
FIGS. 5 and 6 show alternative embodiments of imaging systems according to the invention.

An alternative embodiment, shown in FIG. 5, is based on the fact that the electromagnetic radiation diffracted by a diffraction grating is split into two diffracted paths, each diffracted at the diffraction angle relative to the incident angle but in opposite directions (n=t +1 or −1 in the preceding equations). This embodiment provides two detectors, one on each side of the incident radiation path. In FIG. 5, elements corresponding to elements of FIG. 1 have reference numerals higher by 100. Thus, lenses 110 and 112, aperture 111, DGA 115, lenses 135 and 137, aperture 136, lenses 135 and 137, aperture 136, scan/chop control 130, detectors 140 and 170, processing electronics 145 and timing control 150 are identical or similar to their counterparts numbered 10, 12, 11, etc. in FIG. 1. As in FIG. 1, optical apparatus 135–137 and detector 140 are disposed at the first predetermined angle with respect to electromagnetic radiation incident to DGA 115 so as to detect a scanned image of the scene in electromagnetic radiation of the non-visible wavelength. Although drawn at a similar angle for convenience, optical apparatus 160–162 and detector 170 are disposed at the second predetermined angle with respect to electromagnetic radiation incident to DGA 115 so as to detect a scanned image of the scene in electromagnetic radiation of the visible wavelength. Essentially, the embodiment uses the two-directional split in electromagnetic radiation inherent in diffraction in order to provide convenience in equipment design, such as to provide additional physical space for the optical apparatus required for the diffracted radiation, if such additional space is required or optimal. The signals from detectors 140 and 170 are both provided to processing electronics 145, which, with the aid of timing control 150, may combine the signals into an enhanced visible image in any way described above or anticipated with respect to the apparatus of FIG. 1.

A different approach to diffracting electromagnetic radiation of visible and non-visible wavelengths is to use a diffraction grating array comprising diffraction grating elements with different grating pitches designed to diffract radiation of predetermined visible and non-visible wavelengths at the same angle. In such apparatus, the diffracted radiation of both wavelengths may be directed to a single, wideband detector.

Figure 6:
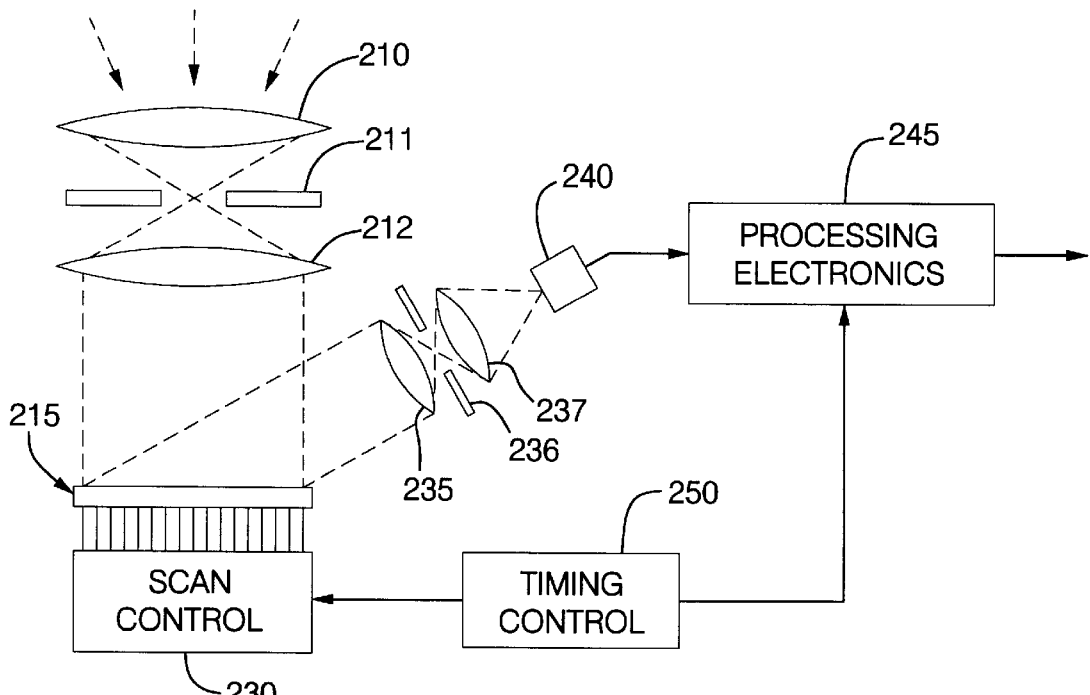
Figure 7:
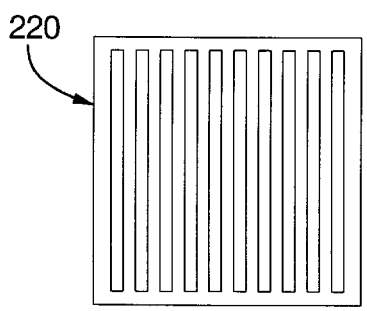
FIGS. 7 and 8 show diffraction grating elements for the embodiment of FIG. 6.
Figure 8:
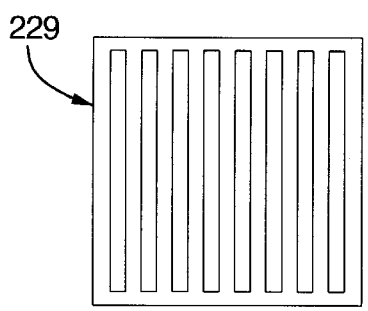
Figure 9:
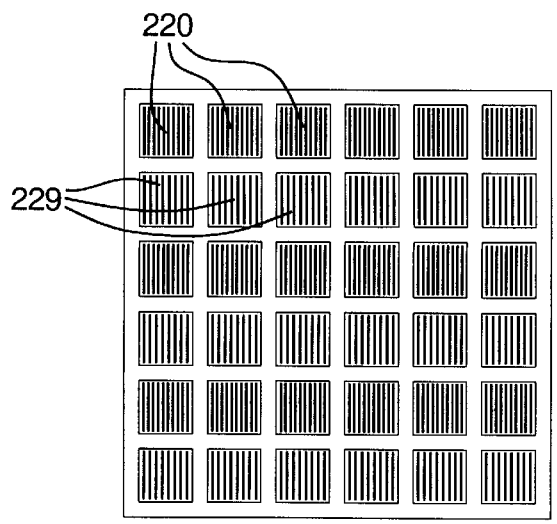
FIG. 9 shows a portion of a diffraction grating array incorporating diffraction grating elements as shown in FIGS. 7 and 8 for use in the embodiment of FIG. 6.

An embodiment using this approach is shown in FIGS. 6–9, in which elements corresponding to elements of FIG. 1 have reference numerals higher by 200. Thus, lenses 310 and 312, aperture 311, lenses 335 and 337, aperture 336, scan/chop control 330, detector 340, processing electronics 345 and timing control 350 are identical or similar to their counterparts numbered 10, 12, 11, etc. in FIG. 1, except as described below. DGA 315, while similar in construction to its counterpart DGA 15 in FIG. 2, contains two types of DG elements. DGA elements 320, as shown in FIG. 7, have a first grating pitch which, in the activated state, diffract electromagnetic radiation of a first frequency at a predetermined angle. DGA elements 329, as shown in FIG. 8, have a different grating pitch which, in the activated state, diffract radiation of a second frequency at the same predetermined angle. As seen in FIG. 9, DGA 315 provides DGA elements 320 and 329 in a predetermined alternating pattern. It is shown in alternating rows but may alternatively have alternating columns or may alternate in both the row and column directions. Thus, diffracted radiation of both frequencies is directed to detector 340, which is capable of detecting electromagnetic radiation at both the visible and non-visible wavelengths and which generates a signal containing alternating scanned image data at both visible and non-visible wavelengths. Since the time and spatial separations of these scanned images are known precisely, they may be processed and combined in processing electronics 345 essentially as previously described with respect to the apparatus of FIG. 1.

If the visible and non-visible wavelengths are such as to require separate detectors or if such separate detectors are required for optimal performance, the embodiment of FIG. 6 presents packaging difficulties, since both wavelengths are diffracted at the same angle in the same direction. However, the mixed element diffraction grating array 315 of FIG. 6 could still be used in an arrangement such as that of FIG. 5, with the optical apparatus 135–137 and detector 140 on one side and the optical apparatus 160–162 and detector 170 on the other side disposed at the same diffraction angle, as shown. In this implementation, each detector would respond only to one of the visible and non-visible wavelengths, with filtering provided if required to assure such response.

We claim:

1. An imaging system comprising, in combination:

an array of bi-state diffraction grating elements, each bi-state diffraction grating element having an activated state providing diffraction of incident electromagnetic radiation of predetermined visible and non-visible wavelengths in a predetermined manner and an inactivated state not providing diffraction of the incident electromagnetic radiation of predetermined visible and non-visible wavelengths in the predetermined manner;

first optical means for collecting electromagnetic radiation of the visible and non-visible wavelengths from a scene and directing the collected electromagnetic radiation toward the array of bi-state diffraction grating elements to form a combined image of the scene thereon in electromagnetic radiation of the visible and non-visible wavelengths;

means for scanning the combined image on the array by sequentially activating the bi-state diffraction grating elements, in a predetermined order, temporarily from their deactivated states to their activated states, whereby separate scanned images of the scene in electromagnetic radiation of the visible and non-visible wavelengths are diffracted from the array in the predetermined manner;

second optical means for collecting and directing electromagnetic radiation of the visible and non-visible wavelengths diffracted from the grating elements in the predetermined manner;

detector means disposed to receive and detect the electromagnetic radiation of the visible and non-visible wavelengths collected and directed by the second optical means so as to provide coded electrical representations of the separate scanned images of the scene in electromagnetic radiation of the visible and non-visible wavelengths; and means for combining the coded representations of the separate scanned images of the scene in electromagnetic radiation of the visible and non-visible wavelengths and generating therefrom an enhanced human-detectable signal.

2. The imaging system of claim 1 in which:

the bi-state diffraction grating elements in their activated states provide diffraction of incident electromagnetic radiation of the visible wavelength at a first predetermined angle relative to an incident direction and incident electromagnetic radiation of the non-visible wavelength at a second predetermined angle relative to the incident direction; and the second optical means comprises first apparatus disposed to collect and detect the electromagnetic radiation of the visible wavelength diffracted at the first predetermined angle and second apparatus disposed to collect and direct the electromagnetic radiation of the non-visible wavelength diffracted at the second predetermined angle.

3. The imaging system of claim 1 in which the array of bi-state diffraction grating elements comprises bi-state diffraction grating elements having a first grating pitch providing, in the activated state, diffraction of electromagnetic radiation of the visible wavelength at a predetermined angle relative to an incident direction and bi-state diffraction grating elements having a second grating pitch providing, in the activated state, diffraction of electromagnetic radiation of the non-visible wavelength at the predetermined angle relative to the incident direction, the diffraction grating elements having the first grating pitch being mixed in the array with the diffraction grating elements having the second grating pitch in a predetermined alternating pattern so that the means for scanning provides scanned images of the scene at each of the visible and non-visible wavelengths at the predetermined angle.

* * * * *